United States Patent [19]

Lehureau et al.

[11] 3,839,061
[45] Oct. 1, 1974

[54] TAR COMPOSITIONS COMPRISING TRIFUNCTIONAL ALIPHATIC EPOXIDE DILUENTS

[75] Inventors: Jean Lehureau, Lyon; Jean-Philippe Rieux, Decines, both of France

[73] Assignee: Rhone-Progil, Paris, France

[22] Filed: Apr. 7, 1972

[21] Appl. No.: 242,226

[30] Foreign Application Priority Data
Apr. 9, 1971 France.............................. 71.13841

[52] U.S. Cl.............. 106/284, 260/28, 260/28.5 AS
[51] Int. Cl............................................ C08h 13/10
[58] Field of Search ........ 260/28, 28.5 AS; 106/284

[56] References Cited
UNITED STATES PATENTS

| | | | |
|---|---|---|---|
| 2,633,458 | 3/1953 | Shokal | 260/30.4 R X |
| 2,765,288 | 10/1956 | Whittier | 260/28 |
| 2,980,601 | 4/1961 | Meigs | 260/28 X |
| 3,033,088 | 5/1962 | Wittenwyler | 260/28 X |
| 3,219,602 | 11/1965 | Scheibli | 260/28 X |
| 3,297,056 | 1/1967 | McLaughlin et al. | 260/28.5 AS X |
| 3,488,404 | 12/1967 | Parker, Jr. | 260/830 |
| 3,514,418 | 5/1970 | Schwarzer | 260/28 |

FOREIGN PATENTS OR APPLICATIONS 996,499   6/1965   Great Britain

OTHER PUBLICATIONS

Abraham, Asphalts and Allied Substances, Fifth Ed., Vol. 1, Published by D. Van Nostrand Co. Inc., N.J., 1945, TN 853 A35 1945 C.4 Pages 56 through 69.

Primary Examiner—Melvyn I. Marquis
Attorney, Agent, or Firm—Bacon & Thomas

[57] ABSTRACT

Aliphatic triepoxides derived from the condensation of an aliphatic triol with an epihalohydrin function as highly reactive diluents in compositions comprised of tars, diepoxides, and curing agents, and which triepoxide diluents permit the use of a major proportion of tar in the compositions without adversely affecting the physical properties of the resultant compositions.

9 Claims, No Drawings

3,839,061

TAR COMPOSITIONS COMPRISING TRIFUNCTIONAL ALIPHATIC EPOXIDE DILUENTS

BACKGROUND OF THE INVENTION

This invention relates to new compositions comprised of tars, epoxy resins, and curing agents, and more specifically, to highly reactive triepoxide diluents for such compositions which are utilized in the preparation of concretes or mortars, sealing and priming coatings for bridges, viaducts, roads, etc., and as surfacing compositions for roadways, walkways, runways, and the like.

Compositions containing tars, epoxides, and curing agents are generally known in the prior art. However, the tar content of these hitherto known compositions has been limited to less than 60% by weight of the overall composition as a consequence of the unacceptable performance of compositions containing more than about 60% of tar when subjected to varying temperature conditions. As a result of the difficulties encountered with the use of such compositions, numerous suggestions have been made concerning methods of alleviating the aforesaid problem. One approach to the problem has been the introduction of diluents into the tar composition. The earliest proposed diluents were substances which were inert with respect to the composition and included such materials as pine or terpene oils. The inclusion of such inert oils did not prove satisfactory inasmuch as the compositions were rendered unstable with the passage of time because of the evaporation of the oil components thereby materially altering the physical properties of the product. More recently, reactive epoxide mono-or difunctional compounds, such as, butylglycidyl ether, epoxidized phenol, diepoxidized hexane diol, etc., have been proposed as diluents. The utilization of these mono- and difunctional epoxides has obviated the problem of evaporation and instability of the product compositions but the compositions remain wholly inadequate with respect to their overall performance and are especially deficient with regard to their lack of resistance to attack by foreign chemical agents. Therefore, a need exists for a tar composition capable of containing a high content of tar without disadvantageously altering the physical properties of the final product.

SUMMARY OF THE INVENTION

Accordingly, it is a primary object of this invention to provide a reactive diluent for tar containing compositions, which diluents permit the use of a major proportion of tar in the resulting product thereby overcoming the deficiencies inherent in prior art compositions.

Another object of this invention is the significant improvement of compositions comprised of tars, diepoxides, and a curing agent by the incorporation therein of a highly reactive trifunctional epoxide diluent thereby yielding a composition which displays an increased resistance to severe weather conditions, heat, wear, solvents, etc., but which retains the physical properties necessary for use as an effective surface coating, building composition, joint forming material, and the like.

Other objects, features, and advantages of this invention will become more apparent to those skilled in the art from the detailed description of the invention which follows.

DETAILED DESCRIPTION OF THE INVENTION

In accordance with this invention, the disadvantages of prior art compositions have been obviated by the use of highly reactive trifunctional epoxide diluents in tar containing compositions. Utilization of the aforesaid diluent in tar containing compositions permits the incorporation of a higher proportion of tar or black binder therein which provides final products characterized by improved physical properties, such as, traction strength, hardness, flexibility, adhesiveness, etc., in addition to a high degree of resistance to varying climatic conditions, heat, wear, and solvents.

The compositions of the present invention are comprised of tars, aryl diepoxides, aliphatic triepoxide diluents, and a suitable curing agent.

As used herein, the expression "tars" is intended to refer to any of a number of dark-colored viscous products obtained by the destructive distillation of organic compounds, such as, coal, wood, etc., and includes coal tars, refined coal tars, and coal tar pitches.

The tars utilized in the instant composition whether crude or modified and from the various origins indicated will advantageously have a maximal STV viscosity of 400/800 seconds (opening 10 mm.). The percentage of tar component in these compositions may vary between about 10 and about 85%, and preferably between about 50 to about 75%.

The aryl diepoxide resins employed in the present compositions are advantageously selected from compounds obtained from the condensation of a diphenol with an epihalohydrin and which have an epoxy oxygen content in the range between about 50 and about 100% of theoretical. Resins obtained from the condensation of bisphenol A [2,2-bis(4-hydroxy phenyl)propane] with epichlorohydrin are especially suitable. However, other aryl diepoxides such as polyepoxy ethers obtained from diepoxide condensation with polyols and especially from diepoxidized bisphenol A condensation with hexane diol may be used in place of the aforementioned epichlorohydrin-bisphenol A resins. The polyepoxy ethers are generally obtained by reaction at a temperature in the range of between 120° and 180°C., with or without catalyst, and under such conditions that 2-oxirane functions correspond to an alcohol function as described in commonly owned U.S. Pat. application Ser. No. 150,743, dated June 7, 1971. The weight percentage of such aryl diepoxide resins employed in the present tar containing compositions may vary between about 3.5% to 45% and preferably between about 5% and about 15%.

The highly reactive aliphatic triepoxide diluents of this invention are obtained from the condensation of an aliphatic triol with an epihalohydrin and consequently have three epoxy groups by molecule. Trimethylolpropane polyglycidyl ether obtained from the reaction of trimethylol propane with epichlorohydrin is an especially valuable trifunctional epoxide for use as a diluent in the instant composition, but a number of other trifunctional epoxides may be used and include, for example, hexane triol polyglycidyl ether. These compounds have been found to be highly reactive diluents which improve the stability of tar compositions over a long period of time, and which after curing yield products having excellent physical properties. The content of trifunctional epoxide diluents in the final composition is generally in the range of about 5 to about 50%, and preferably between about 7 and about 15%.

The inclusion of the trifunctional epoxide diluents of this invention in tar compositions effectively enhances the resistance of these compositions to destructive conditions without altering the physical properties of the final product and therefore these compositions have a wide variety of applications. The expression "constructional unit" is used herein to designate these applications and is intended to include roadways, walkways, runways, terraces, bridges, ship decks, tennis courts, and analogous surfaces having applied thereto the compositions of this invention as well as concretes, mortars, and the like containing the instant composition which form the ultimate supportive or joining material, and further all coatings, joints, surfaces, etc., comprised entirely of the compositions of the present invention.

The epoxide curing agents are preferably selected from aminated compounds having free hydrogen atoms and include, for example, aliphatic, cycloaliphatic, and aromatic amines, amino amides, amido amines, and hydrolyzable imines. These agents are generally used in a weight percentage of between about 3.5% to 45%, and preferably between approximately 5% to 15%.

Where it is desirable that the tar composition be more rapidly cured, it is possible to include accelerating agents such as triethanol amine, phenol compounds such as phenol, cresols, dimethylamino methylphenol, salicylic acids, lactic acids, etc. Moreover, the compositions according to this invention may have incorporated therein additional inert additives, such as surfaceactive agents, adhesives, fillers, reactive or unreactive solvents, aggregate particles including finely divided rocks, sand, shells, quartz, aluminum oxide, etc., and various pigments.

In order to further illustrate the present invention and the advantages thereof, the following specific examples are given, it being understood that the same are intended only as illustrative and in no wise limitative.

Ten compositions were prepared containing respectively different aryl diepoxides and diluents. Examples 1 through 3 are illustrative of the compositions of this invention, while Examples 4 through 10 represent prior art compositions. The amount of each component of the composition including tar and curing agent which was in each example "Versamid 140" (registered trademark) as well as the traction properties of the final product determined with a dynamometer are set forth hereinafter in Table 1.

Example 1 a. Aryl diepoxide — a product resulting from the condensation of diepoxided Bisphenol A (epoxy rate 6.8) with hexanediol.

b. Diluent — trimethylolpropane polyglycidyl ether as a trifunctional epoxide reactive diluent.

Example 2 a. Aryl diepoxide — diepoxidized bisphenol A (epoxy rate 8.66).

b. Diluent — trimethylolpropane polyglycidyl ether.

Example 3 a. Aryl diepoxide — diepoxidized bisphenol A (epoxy rate 6.80).

b. Diluent — trimethylolpropane polyglycidic ether.

Example 4 a. Aryl diepoxide — a product resulting from the condensation of bisphenol A (epoxy rate 6.8) with hexanediol.

b. Diluent — pine oil acting as a non-reactive diluent.

Example 5 a. Aryl diepoxide — identical to Example 4-a).

b. Diluent — terpene oil acting as a non-reactive diluent.

Example 6 a. Aryl diepoxide — identical to Example 4-a).

b. Diluent — epoxidized orthocresol acting as a monofunctional epoxide reactive diluent.

Example 7 a. Aryl diepoxide — identical to Example 4-a).

b. Diluent — butylglycidyl ether acting as a monofunctional epoxide reactive diluent.

Example 8 a. Aryl diepoxide — identical to Example 4-a).

b. Diluent — diepoxidized 1,6-hexanediol acting as a difunctional epoxide reactive diluent.

Example 9 a. Aryl diepoxide — diepoxidized bisphenol A (epoxy rate 8.66)

b. Diluent — pine oil acting as a non-reactive diluent.

Example 10 a. Aryl diepoxide — identical to Example 9-a).

b. Diluent — diepoxidized 1,6-hexanediol as a difunctional epoxide reactive diluent.

Table I

| | Composition | % by weight of aryl diepoxide | % by weight of diluent | % by weight of tar | % by weight of curing agent | T = −15°C $\Delta L^1$ | $R^2$ | T = 20°C $\Delta L$ | R | T = 50°C $\Delta L$ | R |
|---|---|---|---|---|---|---|---|---|---|---|---|
| Compositions according to the invention | 1 | 11.7 | 7 | 70 | 11.5 | 3 | 100 | 140 | 35 | 40 | 4.9 |
| | 2 | 8.2 | 7 | 70 | 14.8 | 1.5 | 100 | 50 | 40 | 26 | 4.2 |
| | 3 | 9 | 7 | 70 | 14 | 1.6 | 80 | 60 | 30 | 30 | 4 |
| Prior Art compositions | 4 | 17.3 | 7 | 70 | 5.7 | 1.8 | 40 | 145 | 16 | 38 | 1.1 |
| | 5 | 17.7 | 7 | 70 | 5.7 | 1.6 | 35 | 175 | 13 | 41 | 1.2 |
| | 6 | 12.4 | 7 | 70 | 10.6 | 1.4 | 28 | 215 | 16.5 | creeping | — |

Table I—Continued

| Composition | % by weight of aryl di-epoxide | % by weight of diluent | % by weight of tar | % by weight of curing agent | T = −15°C ΔL[1] | T = −15°C R[2] | T = 20°C ΔL | T = 20°C R | T = 50°C ΔL | T = 50°C R |
|---|---|---|---|---|---|---|---|---|---|---|
| 7 | 12.8 | 7 | 70 | 10.2 | 1.7 | 12 | 257 | 4 | creeping | — |
| 8 | 12 | 7 | 70 | 11 | 3 | 70 | 152 | 16 | 35 | 1.8 |
| 9 | 12.4 | 7 | 70 | 10.6 | 1 | 30 | 203 | 6 | creeping | — |
| 10 | 8.6 | 7 | 70 | 14.4 | 3 | 100 | 40 | 20 | 28 | 2.2 |

1 ΔL in percentage is traction lengthening.
2 ΔR in kg/cm² is traction strength.

The compositions set forth in Examples 1 and 4 hereinabove were further tested with respect to gas and oil resistance and it was found after 30 days of continuous soaking with the respective injurious solvents that the composition of Example 1 which contained the trifunctional diluent of the present invention had lost only 0.2% by weight in comparison to a 7% by weight loss for the prior art composition of Example 4.

The following example will serve to further illustrate the advantages of this invention:

Example 11

A protective coating having the following composition by weight was deposited on a sanded stell plate 5 mm. thick at the rate of 800 g/m²:

11.5% of the product resulting from the condensation of diepoxided bisphenol A (epoxy rate 8.66) with hexanediol.
7% of triepoxidized trimethylolpropane.
11.5% of "Versamid 140."
70% of tar reconstituted from 90 parts of a Kramer Sarnov pitch 38/41 and from 10 parts of antracenic oil + 5°C. (is to say an anthracenic oil in which the first solid particles appear at + 5°C).

Subsequently a concrete was applied by depositing on the the treated plate a mixture of 6 parts by weight of the composition hereinabove and 16 parts of fine silica on the basis of 18 kg per m².

The product after having been submitted to severe tangential strains (frequent passages of vehicles) and to bad weather over a 6 month period was undamaged while a plate prepared in the same manner but with pine oil as a diluent had cracks and holes therein.

Thus, there is obtained according to this invention a composition comprising a tar, an aryl diepoxide, a trifunctional epoxide reactive diluent, and a suitable curing agent wherein the tar material may represent a major proportion of said composition and which compositions have an improved resistance to adverse climatic conditions, wear, heat and solvents while retaining the requisite qualities of flexibility, adhesiveness, traction and strength for use in the preparation of constructional units.

While the invention has been described and pointed out with reference to certain preferred embodiments thereof, those skilled in the art will appreciate that various changes and modifications and substitutions can be made without departing from the spirit of the invention. It is intended therefore, that the invention be limited only by the scope of the claims which follow.

What is claimed is:

1. In a composition of matter comprising between about 10% to 85% of a tar, between about 3.5% and 45% of an aryl diepoxide and between about 3.5% to 45% of a curing agent, wherein the tar component has a maximal STV viscosity of 400/800 seconds (opening 10 mm.), the improvement comprising the inclusion of between about 5% to 50% of a viscosity reducing aliphatic triepoxide reactive diluent.

2. The composition of matter as defined by claim 1 wherein the tar content ranges between about 50% to 75%, the aryl diepoxide content ranges between about 5% to 15%, the aliphatic triepoxide content ranges between about 7% to 15%, and the curing agent content ranges between about 5% to 15%.

3. The composition of matter as defined by claim 1 wherein the aryl diepoxide component is derived from the condensation of a diphenol with an epihalohydrin.

4. The composition of matter as defined by claim 3 wherein the aryl diepoxide component has an average epoxy oxygen content of between about 50% and about 100% of theoretical.

5. The composition of matter as defined by claim 1 wherein the aryl diepoxide component is derived from polyepoxyethers resulting from the condensation of diepoxides with polyols.

6. The composition of matter as defined by claim 1 wherein the aliphatic triepoxide component is derived from the condensation of an epihalohydrin with an aliphatic triol.

7. The composition of matter as defined by claim 6 wherein the aliphatic triepoxide component is trimethylolpropane polyglycidyl ether.

8. The composition of matter as defined by claim 1 wherein the curing agent is a nitrogen containing compound selected from the group consisting of amines, amino-amides, amido-amines, and hydrolyzable imines.

9. A constructional unit comprised of the composition of matter as defined by claim 1.

* * * * *